United States Patent [19]

Brooks

[11] 4,203,010
[45] May 13, 1980

[54] COMMUNICATION SYSTEM

[75] Inventor: Brian E. Brooks, Burton-on-Trent, England

[73] Assignee: Coal Industry (Patents) Limited, England

[21] Appl. No.: 923,622

[22] Filed: Jul. 11, 1978

[30] Foreign Application Priority Data

Jul. 15, 1977 [GB] United Kingdom .............. 29793/77

[51] Int. Cl.² ............................................. H04B 5/00
[52] U.S. Cl. ........................................ 179/82; 191/10
[58] Field of Search ............. 178/63 R, 63 A; 179/82, 179/81 R, 2 C; 336/229; 191/10; 246/8, 63, 194

[56] References Cited

U.S. PATENT DOCUMENTS

| 1,098,528 | 6/1914 | Reineke | 179/82 |
| 1,375,675 | 4/1921 | Colpitts | 179/82 |
| 2,865,086 | 12/1958 | Whipple | 336/229 |
| 3,448,421 | 6/1969 | Berg et al. | 336/229 |
| 4,099,022 | 7/1978 | Fullerton et al. | 178/63 R |
| 4,113,985 | 9/1978 | Day | 179/81 R |

FOREIGN PATENT DOCUMENTS

| 808541 | 2/1959 | United Kingdom . |
| 809524 | 2/1959 | United Kingdom . |
| 862562 | 3/1961 | United Kingdom . |
| 866297 | 4/1961 | United Kingdom . |
| 1432212 | 4/1976 | United Kingdom . |

Primary Examiner—Thomas A. Robinson
Attorney, Agent, or Firm—Stevens, Davis, Miller & Mosher

[57] ABSTRACT

Data and speech are transmitted along an elongate member from a transmitter to a receiver. Toroids are used to effect a low frequency coupling between the transceivers and the elongate member. The toroids are segmented and their windings are such as to form part of a resonant circuit as well as being arranged around the segments such that external fields are cancelled. Protective shrouds are arranged around at least part of the toroids.

15 Claims, 15 Drawing Figures

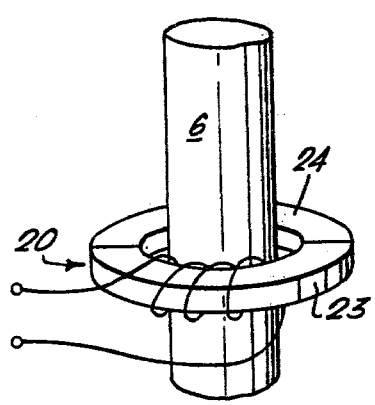
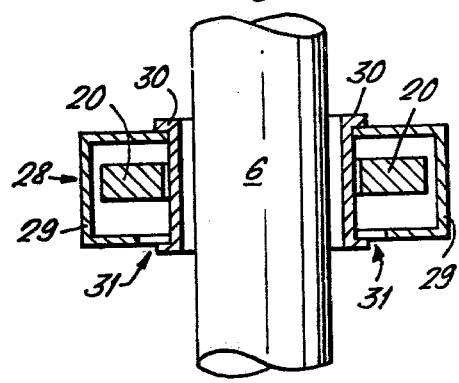
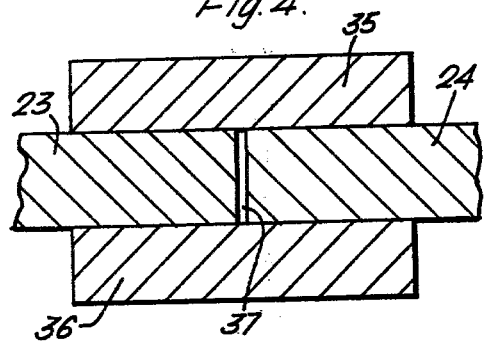
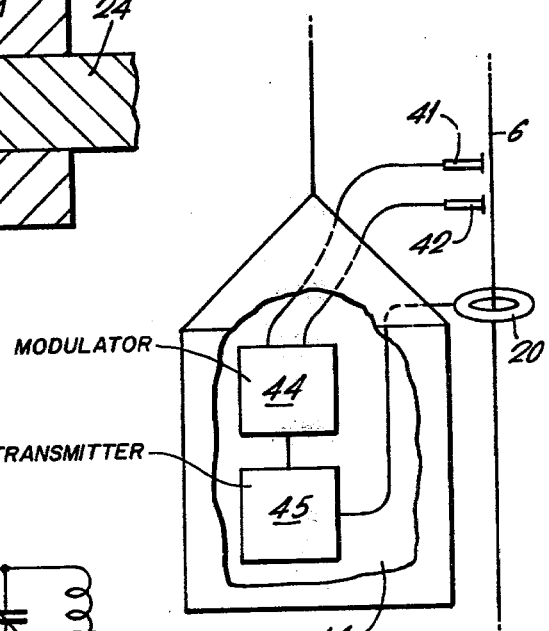
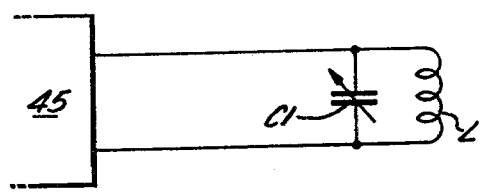

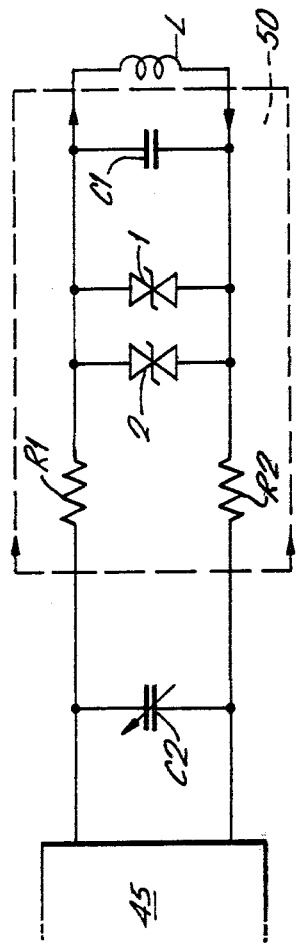
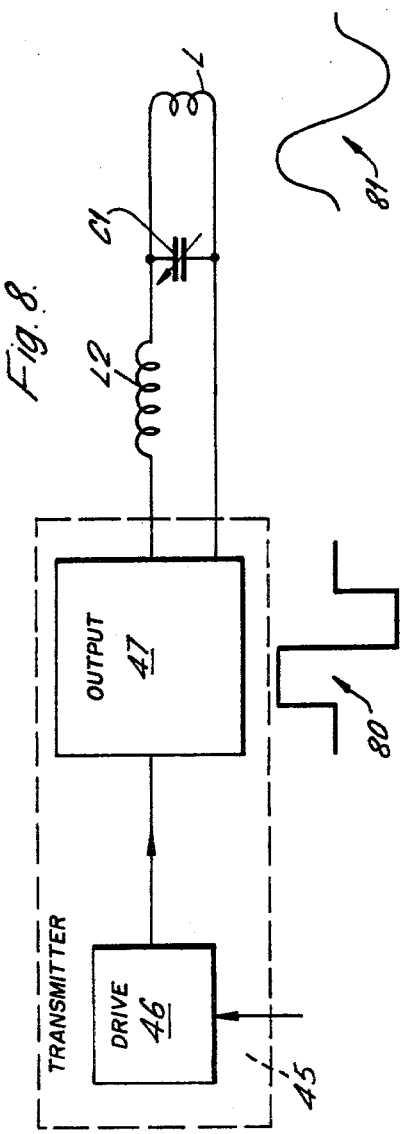

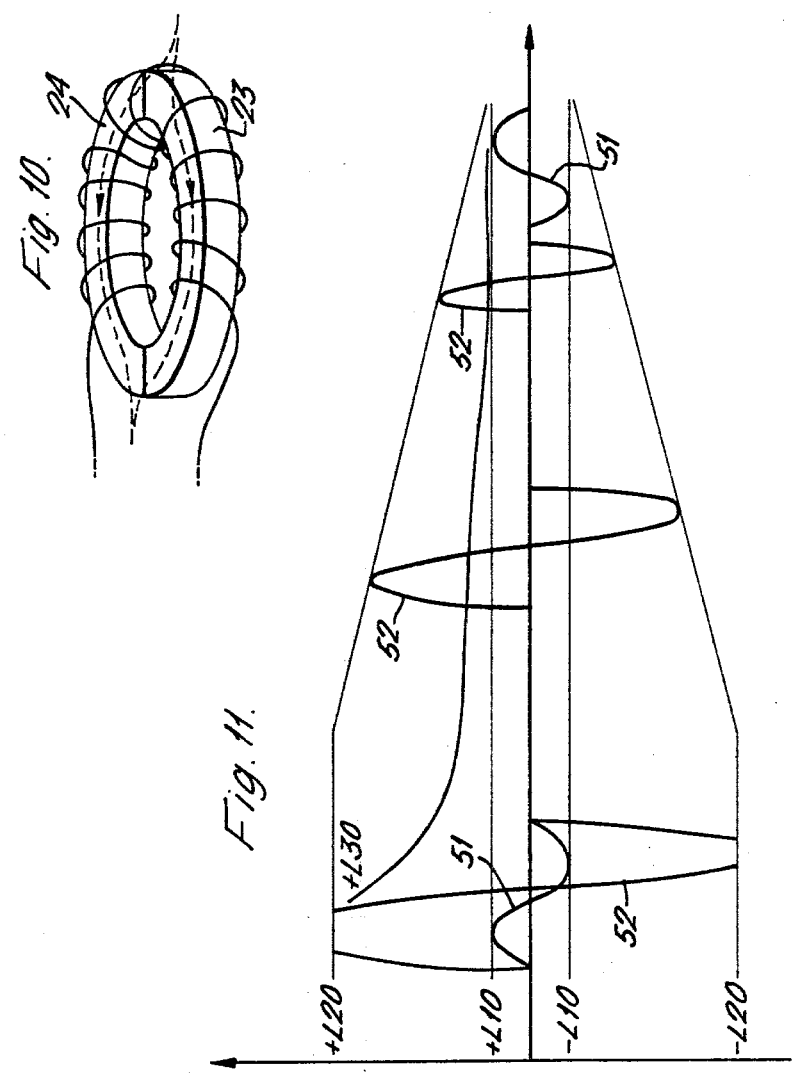

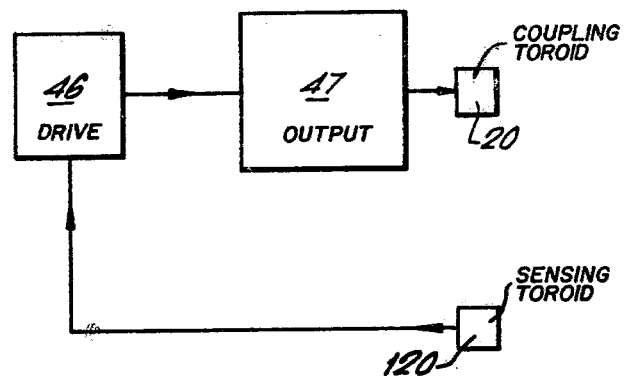
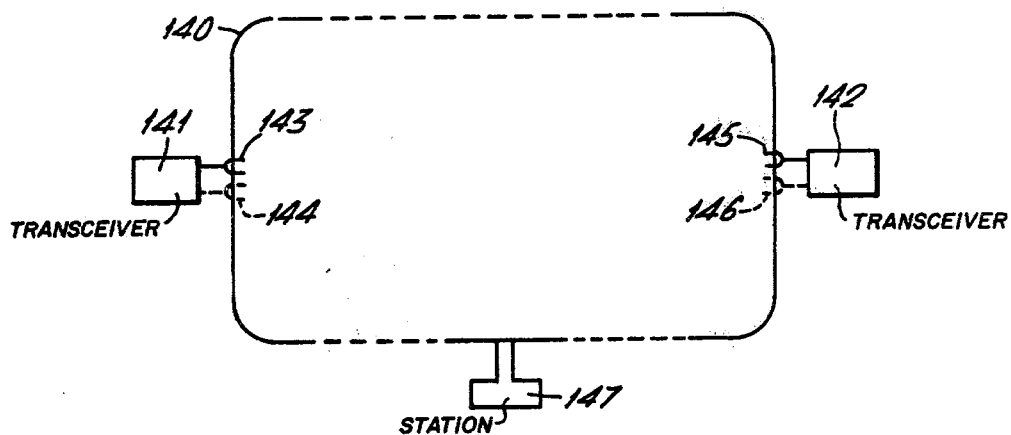
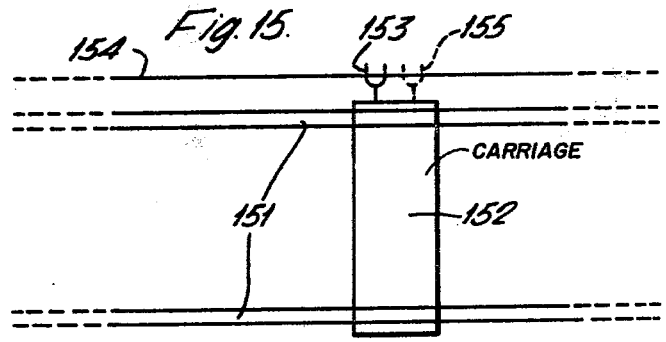

COMMUNICATION SYSTEM

This invention relates to communication systems, particularly those suitable for mining installations. Such as installation comprises a mine shaft and mine winder system for conveying mine cages up and down the mine shaft to effect transfer of men and material from the mine to the surface.

It is desirable for safety and control purposes, that information is transferred from a mine cage to a mine winding house at the surface. Such information includes position data of the mine cage in the mine shaft.

Hitherto, it has been proposed to transfer data from the mine cage to the surface by transmission of electrical signals along a guide rope in the mine shaft. Such a proposal entailed provision of large loop antennae on the mine cage and at the mine surface. Such antennae are susceptible to mechanical damage and are expensive in terms of their battery drain in use. Moreover, coupling between the antennae and the guide rope is inefficient and data signals are susceptible to heavy interference from other electrical equipment.

It is an object of the present invention to mitigate the above disadvantages by providing a mining installation wherein data transmission between mine cages and the mine surface is more efficient than hitherto.

According to one aspect of the present invention, a communication system comprises two transceivers, an elongate metallic member arranged along a desired signal path, toroidal coupler means including a wire winding operably linking at least one of the transceivers to the elongate member and means linking the other transceiver and the elongate member, such that data is transmissible along the desired signal path.

Conveniently, the means linking the other transceiver to the elongate member is a further toroidal coupler means.

According to another aspect of the present invention a mining installation including a mine cage movable up and down a mine shaft comprises data transmission means on the mine cage, data receiving means at the mine surface, a metallic rope in the mine shaft extending at least between the mine cage and the mine surface, a toroidal coupler means operably linking the data transmission means and the metallic rope and a further toroidal coupler means operably linking the data receiving means and the metallic rope such that data is transmissible along the metallic rope.

The toroidal coupler means includes a coupling toroid which is preferably fabricated from ferrite.

A protective shroud is provided for each coupler, respectively.

Conveniently a safety barrier circuit is included in the transmission means.

Advantageously a sensing toroid is arranged adjacent the coupling toroid which sensing toroid senses current in the guide rope.

Conveniently, the sensing toroid output is fed to the transmission means to provide a closed control loop therefor.

The toroids are preferably segmented and lap joints are provided for the segments to enable each toroid to comprise a closed field path.

The protective shroud does not completely surround the respective toroid and so the shrouds do not provide closed field paths.

Four embodiments of the present invention are now described by way of example only with reference to the accompanying drawings in which:

FIG. 2 is an enlarged view of a detail of FIG. 1,

FIG. 3 is a sectional view of a detail of FIG. 1 including part of the detail of FIG. 1, FIG. 4 is a sectional view of a detail of FIG. 2, FIG. 5 is a view of a mine cage incorporating sensors and data transmission equipment.

Figure 9:
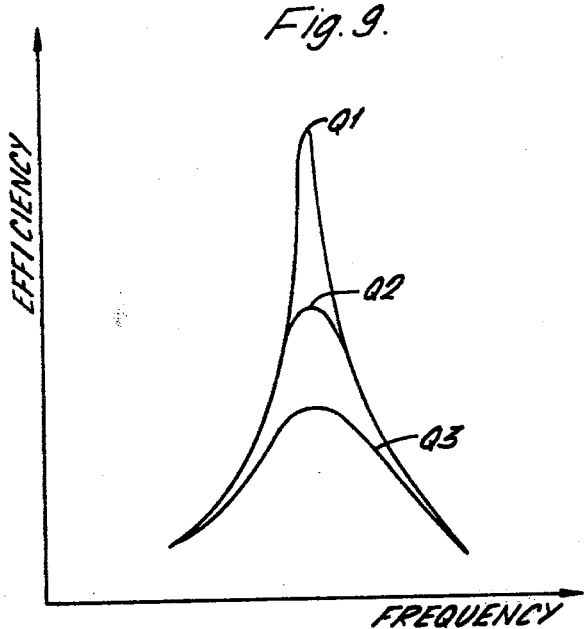
Figure 12:
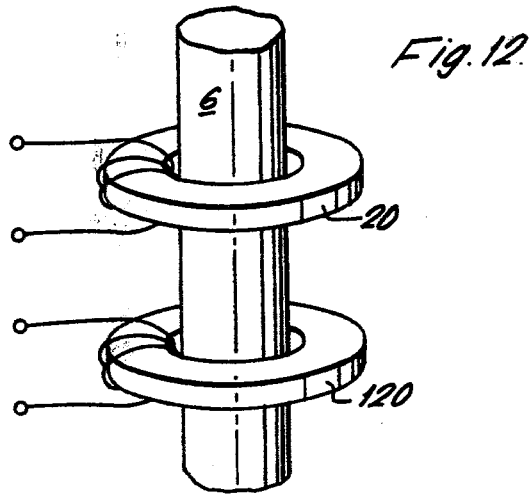

FIG. 6 is an incomplete electrical circuit of a detail of coupling means according to the present invention, FIG. 7 is similar to FIG. 6 but including another detail, FIG. 8 is similar to FIGS. 6 and 7, but showing a different detail, FIG. 9 is a graph of performance parameters of the invention, FIG. 10 is a view of a toroid according to the invention, FIG. 11 is a further graph of performance parameters of the invention, FIG. 12 is a view of part of a mining installation including a second embodiment of the invention, FIG. 13 is a block electrical circuit diagram of apparatus according to a second embodiment of the invention.

FIG. 14 is a diagrammatic view of a third embodiment of the invention and,

FIG. 15 is a diagrammatic view of a fourth embodiment of the invention.

Figure 1:
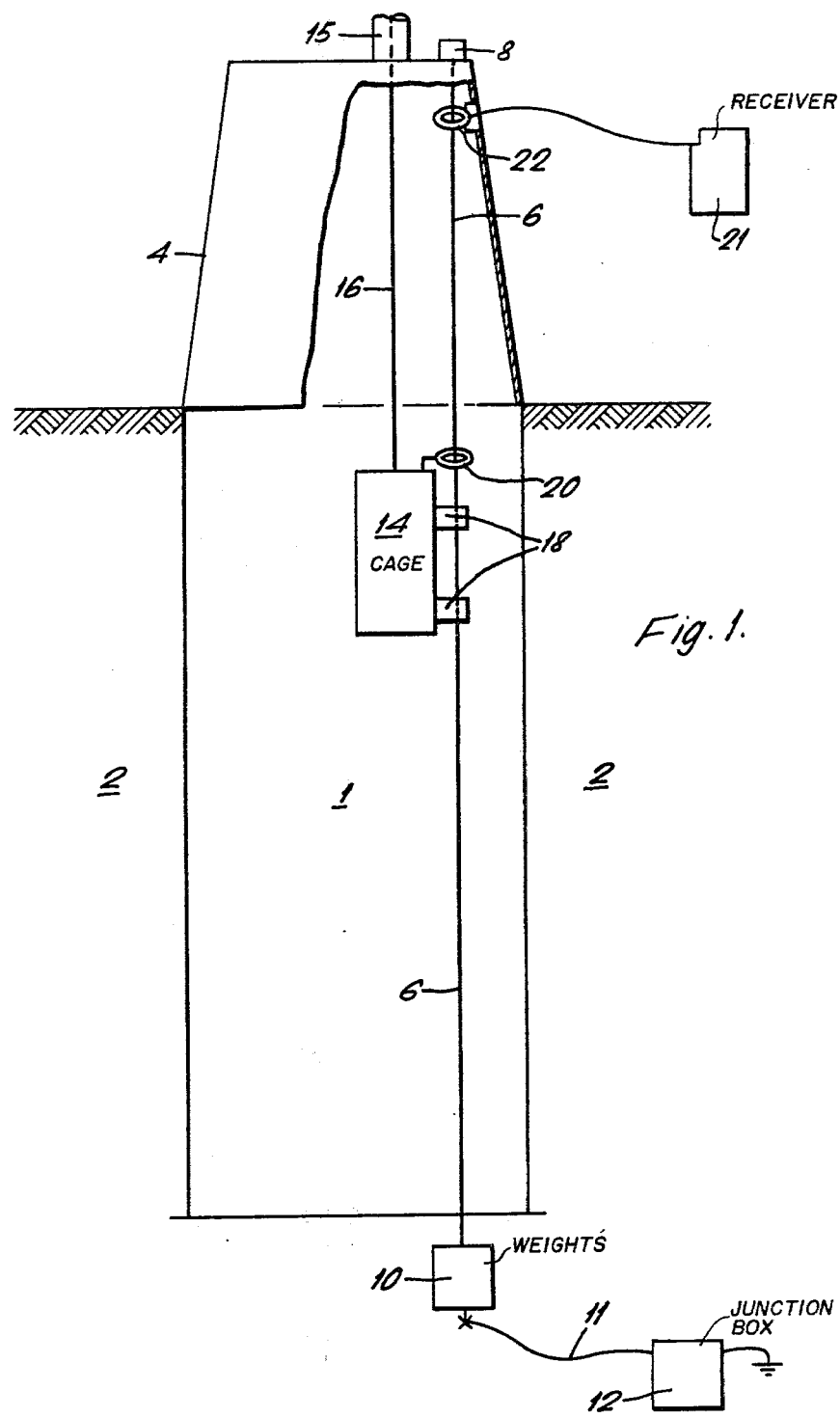
FIG. 1 is a diagrammatic view of a mining installation.

Referring to FIG. 1 of the drawings, a mining installation may be seen to comprise a shaft 1 sunk into the ground 2. A superstructure 4 is mounted on the ground at the shaft top. A guide rope 6 is suspended from the superstructure 4 from a suspension member 8 and runs down the shaft 1. The guide rope 6 is effectively earthed through the superstructure 4. The rope 6 is tensioned by weights 10 on the end thereof, which weights are electrically earthed by a line 11 to an earthed junction box 12.

A mine cage 14 is suspended from mine winding headgear 15 by a winding rope 16. The winding rope 16 is earthed through the headgear 15 and the superstructure 4. The mine cage 14 has an intermittent electrical contact with the guide rope 6 through slippers 18 which slip on the guide rope 6 as the mine cage is hauled up and down the shaft 1.

A coupling toroid 20 is fixed to the mine cage which toroid electrically couples data transmission means (not shown in FIG. 1 but shown in more detail subsequently) in the mine cage 14 to the guide rope 6. A similar coupling toroid 22 is attached to the super structure 4, which toroid 22 electrically couples data receiving means 21 on the mine surface to the guide rope 6.

Referring to FIG. 2, the coupling toroid 20 is shown in more detail and may be seen to comprise two halves 23 and 24. The two halves are clamped together around the guide rope 6. One half 23 of the toroid is shown as wound with wire 26 (but see FIG. 10 below) and this wire 26 is connected to the previously mentioned data transmission means.

Referring now to FIG. 3, the toroid 20 is shown provided with a shroud or liner 28. The shroud or liner 28 comprises two portions 29 and 30 for protecting the toroid 20 against mechanical damage and for providing a smooth surface for interacting with the rope 6. The liner 28 does not completely surround the toroid 20, since otherwise a closed loop would be provided for fields round the toroid and the coupling characteristics between the toroid and rope 6 would be irretrievably impaired. A small gap 31 ensures that such a closed loop is not provided.

Referring to FIG. 4, the clamping arrangement for the two halves 23 and 24 of the toroid 20 is shown in more detail and may be seen to comprise a lap joint. Joint members 35 and 36 are held onto the toroid parts 23 and 24 by friction. From the Figure it can be seen that there is a small gap 37 between the toroid parts 23 and 24. This gap inhibits flux linkage between the parts 23 and 24, but provision of the joint members 35 and 36 ensures that there is a complete path for the flux, since a continuous route exists for example from part 23 to member 35 and so to part 24.

Referring now to FIG. 5, part of an operational mining installation is shown, including the mine cage 14, the guide rope 6 and the toroid 20. Sensors 41 and 42 are attached to the mine cage 14, which sensors sense the guide rope 6. The guide rope 6 is magnetically marked and the sensors detect these magnetic marks. An electrical signal corresponding to the detected magnetic mark configuration is fed to a modulator 44. The modulator 44 causes a low frequency signal (in the examples in the range 15 kHz) to be frequency modulated with the magnetic rope marking data. Transmitter means 45 are connected to the modulator and on to the coupling toroid 20 for transmission through the guide rope 6. The transmission is explained in more detail with respect to operation below.

Turning now to FIG. 6, the winding on the toroid 20 is represented as an inductor L. A tuning capacitor C1 is connected in parallel with the toroid 20 and both are connected to the transmission means 45 output. A parallel resonant use of the toroid inductance L as shown in FIG. 6 ensures that the transmitter means output voltage is not multiplied by the 'Q' factor of the tuned coupling toroid. Such multiplication would occur for example if the toroid were connected in a series resonant mode. The multiplication is undesirable because of the greater safety hazard due to sparking which occurs with a higher voltage. In the parallel resonant circuit shown in FIG. 6, the currents instead and alone are multiplied the 'Q' factor of the tuned toroid and consequently the arrangement is safer. The term 'Q' factor is explained in more detail below with reference to FIG. 9.

Referring to FIG. 7, safety circuitry of the invention is shown in more detail and is included in a barrier arrangement 50. The barrier arrangement 50 is encapsulated and comprises Zener diode arrangements 1 and 2 shunting the inductance L of the coupling toroid to limit voltage in the line from transmitter means 45. Series resistors R1 and R2 limit current in the line to safe values.

It will be appreciated that the series resistances R1 and R2 cause energy losses between the transmitter means 45 and the windings L of the coupling toroid 20. However, as has been pointed out, the inductance L is part of a parallel resonant circuit and consequently said energy losses are reduced by connection of the tuning capacitance directly across the inductance L of the coupling toroid inside the barrier arrangement 50.

In this way circulating multiplied currents produced by the parallel resonant circuit do not flow in the protective resistors R1 and R2 and energy losses are reduced. It is still however, possible to tune the coupling toroid to an exact centre frequency with a fine tuning capacitor C2 connected on the transmitter means side of the protective resistors. The fine tuning capacitor C2 does not carry the full multiplied current and consequently the circuit efficiency is only slightly reduced.

Referring now to FIG. 8, a further aspect of the coupling circuit is outlined, being its harmonic filtering ability. From FIG. 8, it can be seen that the transmitter means 45 comprises a transmitter drive 46 and transmitter output stages 47. It is convenient for efficient electrical operation that square wave signals rather than sine wave signals are used in the transmitter output stages, the square wave ensuring a full swing from off to on in the circuitry. A square wave is shown schematically at 80 below the transmitter output stage 47. A series inductance L2 in combination with the tuning capacitance C1 reject high order harmonics of the transmitter output stage. The inductance L of the coupling toroid 20 and the tuning capacitance C1 are tuned to the frequency of the transmitter output stage and consequently any harmonics remaining after L2 are filtered out. The inductance L and the ferrite coupler reshape a sine wave for transmission in the rope 6. The sine wave is shown at 81. The higher the circuit 'Q' factor, the higher the circuit efficiency.

Referring to FIG. 9, the term 'Q' factor is explained in more detail. FIG. 9 shows a graph wherein coupling efficiency is represented as ordinate and signal frequency as abscissa. Three curves are shown on the graph being $Q_1$, $Q_2$, $Q_3$, and corresponding to high, medium and low Q respectively. In the figure a high Q represented by $Q_1$ gives a greater efficiency, greater current multiplication by the parallel resonent circuit and greater filtering effectiveness for circuit harmonics. On the other hand, a low Q represented by $Q_3$ gives a greater frequency bandwidth for the coupler i.e. more information can be transferred but at a disproportionately greater power cost and susceptible to greater distortion. The present embodiment of the invention operates at a high 'Q' but which is low enough to cause a circuit multiplication of 10 for speech and of 100 for a low speed data channel.

Turning now to FIG. 10, the winding is shown in greater detail. The winding is distributed evenly about the two halves 23 and 24 of the toroid. Such a distribution has an attenuating effect upon interference in the transmitted signal because interfering external magnetic fields linking in the toroid cancel in opposite turns of the winding on the opposite halves of the toroid.

In respect of the above description it should be appreciated that the coupling toroid 22 is constructed in a like manner to the coupling toroid 20.

Operation of the invention is now described with reference to all the so far described Figures. The mine cage 14 is hauled up and down the mine shaft 1 for the purpose of transferring men and materials from the line to the surface. It is essential for safety reasons that information concerning the mine cage position which is derived by the sensors 41, 42 from the rope 6 (FIG. 5) is conveyed to the surface.

As has been outlined above, the signals concerning position are transmitted to the guide rope 6 via the modulator 44, transmitter means 45 and coupling toroid 20. The signals are then transmitted through the guide rope 6 to the coupling toroid 22 and hence to receiving means at the surface. The toroids are protected by the previously mentioned shrouds or liners 29, 30 and so do not suffer mechanical damage. A closed circuit path for the information signal is provided from earth through the suspension 8, the guide rope 6, the tension weights 10, the cable 11, the junction box 12 and then back to earth. A further circuit path which is mentioned in more detail with respect to the second embodiment described below is from earth through suspension 8, guide rope 6, slippers 18 and headgear 15 back to earth.

In operation, battery life for the transmitter means 45 is important through changing difficulties and it is desirable that the battery life be prolonged as long as possible or in other words that the transmitter means uses as little energy as practicable. The high 'Q' factor circuitry described above ensures that the signal from the transmitter means is coupled by the guide rope 6 as efficiently as possible, since the parallel resonant circuit resonates and filters the transmitter signal as outlined above. Another operational consideration is the safety of the transmitted signal, which safety decreases in proportion to the signal voltage and consequent ability to induce sparking which could ignite explosive gas. The barrier circuitry described above with respect to FIG. 7 ensures that such safety exists.

Consequently, it may be seen that the invention provides a data link which uses little battery power, has little interference and which is safe.

If it is required to send other information as well as position details e.g. speech, then if there is not sufficient room on the FM transmitter signal through the coupling toroid owing to the high 'Q' narrow bandwidth, then a further coupling toroid may be placed on the guide rope 6.

A second embodiment of the invention is now described with reference to FIGS. 1, 11, 12 and 13. As had been mentioned, there are two signal paths through guide rope 6, the first being through the junction box 12 and the second through the slippers 18. Intermittent contact only occurs through the slippers 18, but nonetheless this path causes significant fluctuations in signal strength. Amplitude of the received signal is shown in FIG. 11, which is a graph wherein signal magnitude is ordinate and shaft depth abscissa. In the Figure, an information signal through the first path is represented diagrammatically by 51 and comprises an alternating signal alternating between limits +L10 and −L10. A signal through the second path is represented by 52 alternating between limits +L20 and −L20. It may be seen that the second signal falls in magnitude from a high value at the shaft surface to a small value at the shaft bottom. A value of a composite limit for the two signals 51 and 52 is indicated at +L30.

For the best operation of the invention it is desirable that signal 51 only is used for data transmission and consequently that signal 52 be attenuated. This could be done by insulation of the slippers 18 or it could be done as outlined below.

In a second embodiment of the invention therefore (see FIGS. 12 and 13) a further coupling toroid 120 is attached to the mine cage 14 and embraces the guide rope 6. This further coupling toroid 120 acts as a feedback sensing coupler below the transmitting coupler. The provision of toroid 120 prevents rapid signal amplitude fluctuation which occurs especially near the surface owing to contact between slippers 18 and rope 6. The toroid 120 feeds back to the transmitter driver 46 to automatically reduce the current drive to the transmitter output stage 47 when the slipper 18 contact the guide rope 6. This feedback makes the transmitter appear to be a constant current source tending to generate a constant current in the guide rope which is the ideal case. In this way, the sensing toroid 120 causes an improvement in amplitude stability of the signal received from the transmitting means 45.

The invention operates with frequency modulation in both the described embodiments, but it is possible to use amplitude modulation in the second described embodiment because of the greater amplitude stability of the signal. Moreover, the second described embodiment presents a saving in battery life over the first described embodiment because the power requirement on the battery is reduced at the points of enhanced coupling when the slipper 18 contacts the guide rope 6.

In other embodiments of the invention, toroidal couplers may be used in association with other types of antennae. The toroidal couplers may be used with a magnetically marked or plain rope, there being no interaction between the magnetic marking and alternating current coupling signal.

The coupling toroid 22 may be positioned at the shaft top or bottom or may work alone or in association with a further coupling toroid at the bottom or top respectively.

Naturally, the data transmission may also be made from the shaft top and/or bottom of the mine shaft to the mine cage by the invention.

Turning now to FIG. 14, a third embodiment of the invention is shown wherein the communication system is employed in a factory. In the third embodiment of the invention, an insulated cable 140 is fed around a factory. The cable 140 is insulated to protect it from the greasy factory environment.

Transceivers 141 and 142 are coupled to the cable 140 by toroidal couples 143 and 145, respectively. The couplers can be easily snapfitted on and off at various points in the factory, thus obviating the need for plugs and sockets in a dirty environment.

Sensing toroids 144 and 146 are shown dotted and may be fitted to the transceivers 141 and 142, respectively to ensure constant current in insulated cable 140.

The cable 140 is directly connected to a fixed station which is conveniently a control station.

Operation of the third embodiment is similar to the first two described embodiments of the invention.

Referring to FIG. 15, a fourth embodiment of the invention is shown, wherein the communication equipment is applied to a crane jib, which is indicated at 151. A carriage 152 runs along the jib 151. A coupling toroid 153 operably couples the carriage 152 to a guide cable 154. In this way control and information signals can be transmitted from the crane operator to the carriage 152. A sensing toroid 155 is provided to limit signal fluctation when the cable touches the jib, as has been described previously in respect of the second described embodiment of invention.

From the above description, it can be seen that the present invention provides a communication system wherein data can be transferred from a mine cage to the surface and which is more robust, more efficient and uses less power than hitherto.

What I claim is:

1. A communication system comprising two transceivers, an elongate metallic member arranged along a desired signal path, toroidal coupler means including a wire winding operably linking at least one of the transceivers to the elongate member, such that data is transmissible along the desired signal path, and shroud means for protecting said toroidal coupler means, the shroud means being constructed so as not to impair said operable linking.

2. A communication system as claimed in claim 1, wherein the means linking the other transceiver to the elongate member is a further toroidal coupler means.

3. A communication system as claimed in claim 1, wherein the toroidal coupler means comprises at least two segments and the segments are evenly wound with wire to attenuate interference from external fields.

4. A communication system as claimed in claim 3 wherein flux linking members are connected between the segments to provide a closed flux path around the toroid.

5. A communication system as claimed in claim 1, wherein the wire windings act as an inductor in a parallel resonant circuit including a capacitor.

6. A communication system as claimed in claim 1, wherein the toroidal coupler means includes a safety barrier circuit.

7. A communication system as claimed in claim 1, wherein a sensing toroid is coupled to the elongate member for sensing current therein, the sensing toroid being connected to the transceivers to maintain the sensed current substantially constant.

8. A communication system as claimed in claim 1, wherein said shroud means comprises a liner with an air gap for embracing the toroidal coupler means except for the air gap.

9. A communication system as claimed in claim 1, wherein said shroud means provides an open magnetic loop around the toroidal coupler means.

10. A communication system as claimed in claim 9, wherein the shroud means defines an opening in the direction of communication.

11. A communication system as claimed in claim 1, wherein the shroud means includes a smooth surface for mechanically interacting with said elongate metallic member.

12. A mining installation including a mine cage movable up and down a mine shaft comprising data transmission means on the mine cage, data receiving means at the mine surface, a metallic rope in the mine shaft extending at least between the mine cage and the mine surface, a toroidal coupler means operably linking the data transmission means and the metallic rope, a further toroidal coupler means operably linking the data receiving means and the metallic rope, such that data is transmissible along the metallic rope, and a respective shroud means for protecting each of said toroidal coupler means and said further toroidal coupler means, the shroud means being constructed so as not to impair said operable linking.

13. A mining installation as claimed in claim 12, wherein the toroidal coupler means includes a coupling toroid which is fabricated from ferrite to reduce power consumed in the installation.

14. A mining installation as claimed in claim 12, wherein a sensing toroid is coupled to the metallic rope, the sensing toroid sensing current in the rope.

15. A mining installation as claimed in claim 13, wherein the output from the sensing toroid is fed to the transmission means to provide a closed loop control therefor.

* * * * *